(12) United States Patent
Petereit et al.

(10) Patent No.: US 8,493,079 B2
(45) Date of Patent: Jul. 23, 2013

(54) VEHICLE SEAT WITH CAPACITIVE OCCUPANT DETECTION SYSTEM

(75) Inventors: Andreas Petereit, Schweich (DE); Christoph Wendt, Trier (DE); Claus-Christian Kedenburg, Konz (DE)

(73) Assignee: IEE International Electronics & Engineering S.A., Luxembourg (LU)

( * ) Notice: Subject to any disclaimer, the term of this patent is extended or adjusted under 35 U.S.C. 154(b) by 387 days.

(21) Appl. No.: 12/865,137

(22) PCT Filed: Jan. 21, 2009

(86) PCT No.: PCT/EP2009/050631
§ 371 (c)(1),
(2), (4) Date: Sep. 14, 2010

(87) PCT Pub. No.: WO2009/095340
PCT Pub. Date: Aug. 6, 2009

(65) Prior Publication Data
US 2010/0327638 A1    Dec. 30, 2010

(30) Foreign Application Priority Data
Jan. 31, 2008   (EP) .................................. 08150864

(51) Int. Cl.
*G01R 27/28* (2006.01)
(52) U.S. Cl.
USPC ............ 324/663; 324/661; 219/217; 340/667
(58) Field of Classification Search
USPC .................................. 324/688, 661; 340/667
See application file for complete search history.

(56) References Cited

U.S. PATENT DOCUMENTS 5,894,207 A * 4/1999 Goings .......................... 318/478
6,369,468 B1 * 4/2002 Goings et al. .................. 307/125

(Continued)

FOREIGN PATENT DOCUMENTS

| DE | 19724168 C1 | 8/1998 |
| EP | 1787871 A1 | 5/2007 |
| WO | 99/28702 A | 6/1999 |
| WO | 02/06083 A1 | 1/2002 |

OTHER PUBLICATIONS

Smith, Joshua, et al., "Electric Field Sensing for Graphical Interfaces," IEEE Computer Graphics and Applications, May/ Jun. 1998, pp. 54-60.

(Continued)

*Primary Examiner* — Richard Isla Rodas
(74) *Attorney, Agent, or Firm* — Cantor Colburn LLP (57) ABSTRACT

A vehicle seat is provided in combination with a seat heater and a capacitive occupant detection system. The seat heater comprises a seat heating element disposed in the vehicle seat while the capacitive occupant detection system comprises a measurement circuit and an electrode arrangement, which is also disposed in the vehicle seat. The electrode arrangement includes a sensing electrode and a shielding electrode. The measurement circuit is operatively connected to the sensing electrode and to the shielding electrode and configured to keep the sensing electrode and the shielding electrode at substantially the same electric potential during the capacitive measurement. Of the seat heating element, the sensing electrode and the shielding electrode, the seat heating element is closest to a seating region of the vehicle seat and the sensing electrode is arranged between the seat heating element and the shielding electrode.

12 Claims, 4 Drawing Sheets

U.S. PATENT DOCUMENTS

| | | | |
|---|---|---|---|
| 6,520,535 B1 * | 2/2003 | Stanley et al. | 280/735 |
| 6,703,845 B2 * | 3/2004 | Stanley et al. | 324/663 |
| 6,960,841 B2 * | 11/2005 | Saitou et al. | 307/10.1 |
| 7,134,715 B1 * | 11/2006 | Fristedt et al. | 297/180.12 |
| 7,663,378 B2 * | 2/2010 | Ito et al. | 324/663 |
| 7,796,017 B2 * | 9/2010 | Kiribayashi | 340/425.5 |
| 7,928,341 B2 * | 4/2011 | Ito et al. | 219/217 |
| 2001/0045733 A1 | 11/2001 | Stanley et al. | |
| 2006/0164254 A1 * | 7/2006 | Kamizono et al. | 340/667 |

OTHER PUBLICATIONS

International Search Report PCT/EP2009/050631; Dated May 27, 2009.

* cited by examiner

VEHICLE SEAT WITH CAPACITIVE OCCUPANT DETECTION SYSTEM

TECHNICAL FIELD

The present invention generally relates to a capacitive occupant detection system for a vehicle seat equipped with a seat heater element.

BACKGROUND

The principles of capacitive sensing (or, as called by some, electric field sensing or proximity sensing) are well known in the art. The technical paper entitled "Electric Field Sensing for Graphical Interfaces" by J. R. Smith, published in Computer Graphics I/O Devices, Issue May/June 1998, pp. 54-60 gives an overview of different techniques. The author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode, which is influenced by the body being sensed, is measured. In the "transmit mode", the transmit electrode is put in contact with the user's body, which then becomes a transmitter relative to a receiver, either by direct electrical connection or via capacitive coupling. "Shunt mode" is alternatively referred to as "coupling mode".

The electrode whose capacitance to ground or another electrode of the system is determined is herein referred to as "sensing electrode". It should be noted that capacitance may be determined in various ways, e.g. by measuring amplitude and phase of the current flowing in the sensing electrode, the charging time of the sensing electrode, and the like.

The to be determined capacitance of the sensing electrode is influenced by conductive elements in the vicinity of the sensing electrode. To reduce the sensitivity of the sensing electrode with respect to regions that are of no or lesser interest (such as, in case of an occupant detection system of a vehicle seat, the region underneath the seat surface), it is known to provide a so-called driven shield electrode in between the sensing electrode and the said region of no or lesser interest. During the capacitance measurement, the driven shield electrode (hereinafter referred to as "shielding electrode") and the sensing electrode are kept at substantially the same electric potential so that the electric field between the sensing electrode and the driven shield electrode substantially cancels. Occupant detection systems featuring such a shielding electrode are described, for instance, in WO 99/28702 and EP 1 787 871. Vehicle seats may be equipped with seat heaters to increase the occupant's comfort when driving in cold weather conditions. Such seat heaters normally comprise one or more electrical heating elements, integrated in the seating portion, the side bolsters and/or the seat backrest, which dissipate heat when a current is caused to flow therein. Such heating elements represent conductive structures, which influence the electrical field of a capacitive sensing system and thus the measurements performed by that system. In conventional arrangements, to prevent the sensing electrode from coupling to the seat heating elements, the latter are arranged deeper within the seat than the electrodes of the capacitive sensing system, with the shielding electrode being interposed between the sensing electrode and the heating elements. The drawback of such an arrangement is that the heating of the seat surface becomes less effective, first, because of the increased distance to the seat surface and, second, because of the additional heat shielding effect of the electrode arrangement.

BRIEF SUMMARY

The invention provides an arrangement comprising a capacitive occupant detection system and a seat heater for a vehicle seat overcoming or at least reducing the above-mentioned problem.

The present invention proposes an arrangement comprising a vehicle seat in combination with a seat heater and a capacitive occupant detection system. The seat heater comprises a seat heating element disposed in the vehicle seat while the capacitive occupant detection system comprises a measurement circuit and an electrode arrangement, which is also disposed in the vehicle seat. The electrode arrangement includes a sensing electrode and a shielding electrode. The measurement circuit is operatively connected to the sensing electrode and to the shielding electrode and configured to keep the sensing electrode and the shielding electrode at substantially the same electric potential during the capacitive measurement. As mentioned hereinbefore, this assures that the electric field between the sensing electrode and the shielding electrode substantially cancels during the capacitive measurement, making the sensing electrode sensitive only on the side facing away from the shielding electrode. As an aspect of the invention, of the seat heating element, the sensing electrode and the shielding electrode, the seat heating element is closest to the seating region of the vehicle seat and the sensing electrode is arranged between the seat heating element and the shielding electrode. It shall be noted that the disposition of the heating element closest to the surface of the vehicle seat which comes into contact with the occupant greatly enhances the efficiency of the seat heater, reduces the time for the occupant to feel the warmth of the seat and thus increases the occupant's seating comfort in cold weather conditions.

According to a preferred aspect of the invention, the seat heater may be operatively connected to the same electric potential as the shielding electrode or the sensing electrode, with the effect of reducing the capacitive coupling between the sensing electrode and the seat heating element: the seat heating element is said to be made "invisible" for the sensing electrode or is used as a part of the sensing electrode. Preferably, the seat heater comprises a current source (as used herein this term may designate an ideal current source, a voltage source, a battery, etc.) and a current sink (e.g. the second terminal of the current source or ground). Both current source and current sink can but need not be arranged within the vehicle seat. The seat heating element may be operatively connected to the current source via a first node and to the current sink via a second node. The capacitive occupant detection system preferably comprises a capacitive measurement circuit, to which the sensing electrode and the shielding electrode are operatively connected via a third node and a fourth node, respectively. Preferably, an electrically controllable switching arrangement is provided, which comprises— an electrically controllable first switch arranged between the first node and the current source, the first switch having a closed state, in which the first node is connected to the current source by the first switch and an open state, in which the first node is disconnected from the current source by the first switch; —an electrically controllable second switch arranged between the second node and the current sink, the second switch having a closed state, in which the second node is connected to the current sink by the second switch and an open state, in which the second node is disconnected from the current sink by the second switch; —an electrically controllable third switch arranged between the first and fourth nodes, the third switch having a closed state, in which the first node is connected to the fourth node by the third switch and an open state, in which the first node is disconnected from the fourth node by the third switch; and —an electrically controllable fourth switch arranged between the second and fourth nodes, the fourth switch having a closed state, in which the second node is connected to the fourth node by the fourth switch and an open state, in which the second node is disconnected from the fourth node by the fourth switch.

Those skilled will appreciate that numerous combinations of open and/or closed states of the various switches are theoretically possible. Such combinations are hereinafter referred to as switching states of the switching arrangement. The switching arrangement is configured in such a way as to be able to be put into at least the following switching states: a first switching state for heating operation of the seat heater, in which the first and second switches are in closed state and the third and fourth switches are in open state; and a second switching state for capacitive occupant detection of the capacitive occupant detection system, in which the first and second switches are in open state and the third and fourth switches are in closed state.

Advantageously, the arrangement comprises an integrity check circuit, the integrity check circuit including a DC voltage source, a current measuring means, such as a current meter and an electrically controllable fifth switch, the DC voltage source being operatively connected to the fourth node via the fifth switch and the current measuring means being arranged so as to measure current flowing through the fifth switch when the fifth switch is in closed state. Those skilled will appreciate that in case the seat heating element is electrically connected to the shielding or the sensing electrode when the capacitive measurement is made, it is preferably treated as a safety-relevant component. The integrity check circuit, possibly in combination with some of the components discussed hereinafter, allows detecting short-circuits (e.g. caused by liquid spilled on the seat) and/or line interruptions, (e.g. due to malfunctioning switches or tear of the conductive lines). By closing the fifth switch, opening the first and second switches, closing also the third and fourth switches and measuring the voltage on the third node one can conclude that a short circuit has occurred between sensing electrode and shielding electrode or between sensing electrode and seat heating element if the voltage on the third node corresponds to the voltage applied to the fourth node by the DC voltage source. One can distinguish between these two possibilities by opening the third and fourth switches. If the voltage on the third node still corresponds to the voltage applied to the fourth node by the DC voltage source, then the short circuit has occurred between sensing and shielding electrode.

Preferably, the arrangement comprises an electrically controllable sixth switch arranged between the third and fourth nodes, the sixth switch having a closed state, in which the third node is connected to the fourth node. Preferably also, a first resistor, having a resistance exceeding the nominal resistance of the seat heating element by a factor of at least 100, preferably of at least 400, is connected between the second node and ground. The arrangement may also comprise a second resistor, having a resistance exceeding the nominal resistance of the seat heating element by a factor of at least 100 preferably of at least 400, connected between the first node and ground. The functionality of these elements will become apparent from the detailed description of preferred mode of carrying out the invention.

Preferably, a third resistor is provided, which is connected between the first and second nodes in parallel to the seat heating element, and which has a resistance exceeding the nominal resistance of the seat heating element by a factor of at least 100, preferably of at least 400. Still more preferably, the a first diode is connected between the first node and the parallel connection of the third resistor and the seat heating element, and a second diode is connected between the second node and the parallel connection of the third resistor and the seat heating element, the forward directions of the first and second diode being from current source to current sink, so that the heating current is allowed to flow through the seat heating element if the first and second switches are closed.

According to a preferred version of the arrangement with the two diodes, an electrically controllable seventh switch is connected between the third node and the parallel connection of the third resistor and the seat heating element. When the seventh switch is closed, while the first, second, third, fourth, fifth and sixth switches are open, the seat heating element is shorted to the sensing electrode for the capacitive measurement. In this configuration, the seat heating element is thus used as an extension of the sensing electrode.

BRIEF DESCRIPTION OF THE DRAWINGS

Further details and advantages of the present invention will be apparent from the following detailed description of several not limiting embodiments with reference to the attached drawings, wherein.

DETAILED DESCRIPTION

Figure 1:
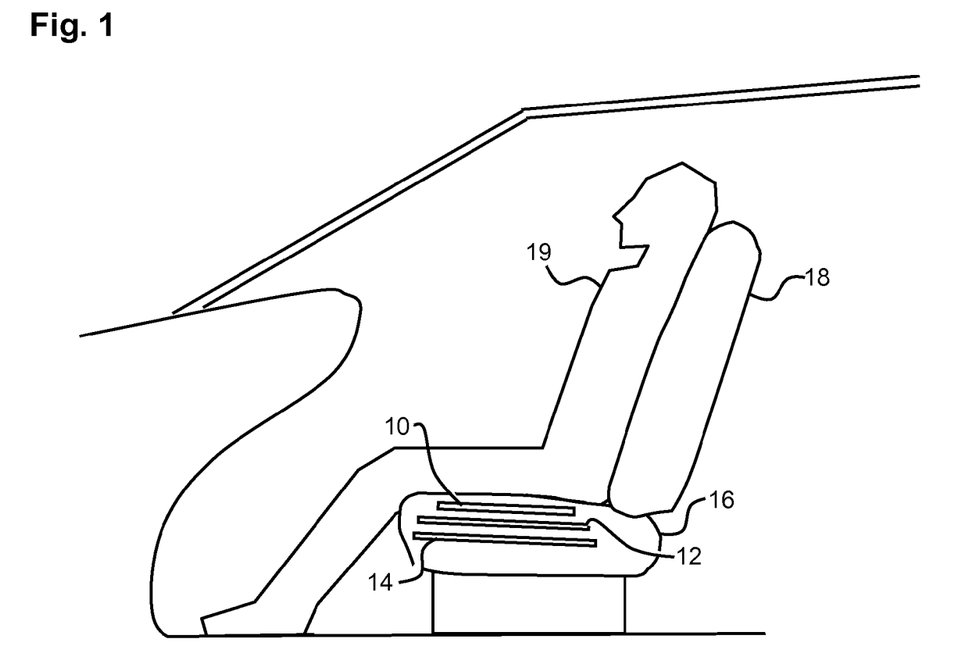
FIG. 1 is a schematic illustration of an arrangement according to the invention.

FIG. 1 schematically shows the arrangement of a seat heating element 10, a sensing electrode 12 and a shielding electrode 14 within the seating portion 16 of a vehicle seat 18. Of the components 10, 12 and 14, the seat heating element 10 is arranged closest to the upper surface of the seating portion 16. Preferably, the seat heating element 10 is arranged in or directly below the seat trim. The deeper the seat heating element 10 is disposed in the seat, the more seat material will have to be heated up before the occupant 19 perceives the warmth of the seat. Accordingly, the present invention has the advantage of bringing the seating surface of the vehicle to a comfortable temperature in a shorter time than conventional systems in which the seat heating element 10 is arranged below the shielding electrode 14. The sensing electrode 12 is arranged deeper in the vehicle seat 18 (as seen from the seating surface) than the seat heating element 10 but less deep than the shielding electrode 14, which shields the sensing electrode 12 against the influence of the seat frame or any other conductive body behind the shielding electrode 14. As those skilled will appreciate, the gaps between the seat heating element, the sensing electrode 12 and the shielding electrode 14 are not to scale in the drawing. Preferably, the sensing electrode 12 and the shielding electrode 14 are arranged as conductive layers on the opposite sides of a common substrate of electrically insulating material, such as, for instance, a flexible polymer carrier film. The electrodes 12 and 14 could also be made of conductive textile, separated from one another by an electrically insulating textile spacer layer, e.g. a warp-knitted 3D fabric. In a more basic embodiment, each one of the electrodes 12 and 14 may be provided as a conductive layer on an individual substrate, the electrodes 12, 14 being spaced from one another by one or more layers of electrically insulating material which may be foamed sheets, sheets made of woven or non-woven fabric, polymer sheets, etc. As concerns the seat heating element 10, it may comprise resistive fibres, one or more resistive traces on a suitable carrier material, be present in form of a heating cable, etc. The seat heating element 10 and the electrodes 12 and 14 may be provided as separate components, which are put together at the assembly of the vehicle seat. More preferably, the seat heating element 10 and the electrodes 12 and 14 are provided as a constructional unit, which is ready for integration into the vehicle seat.

Figure 2:
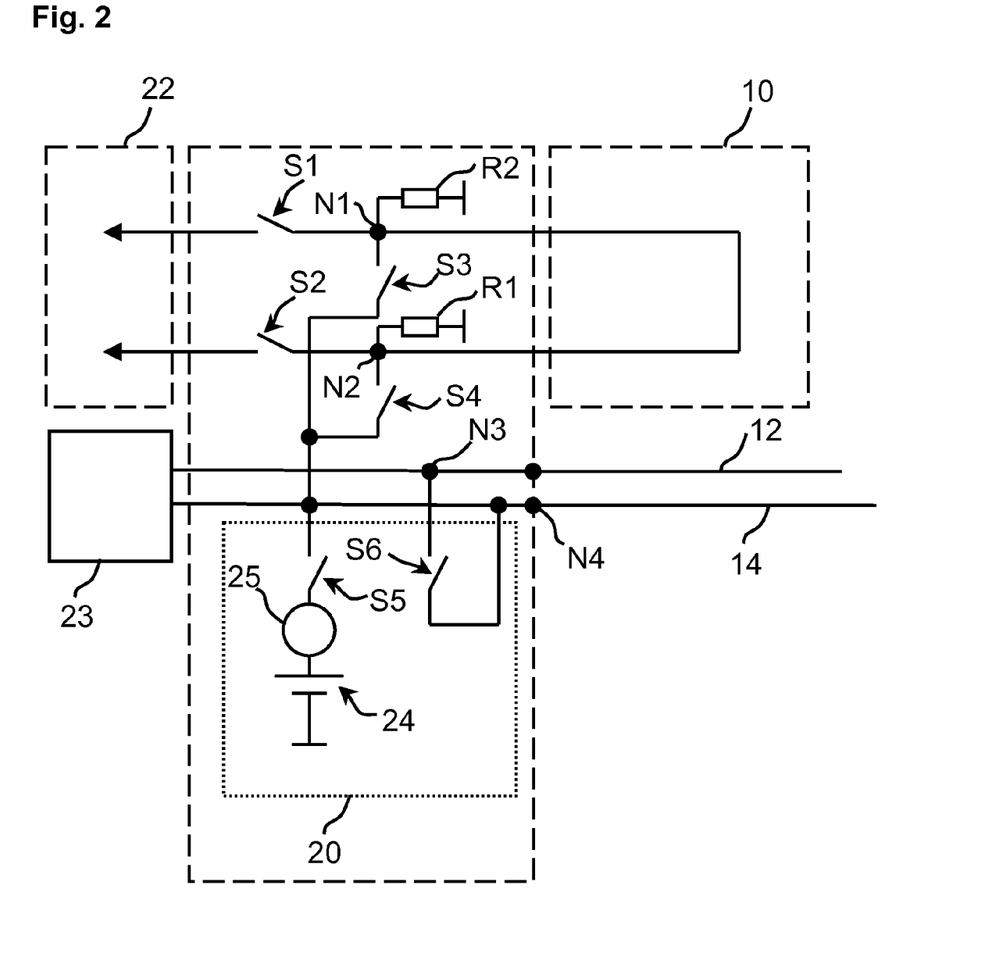
FIG. 2 is a schematic illustration of a seat heater, a capacitive occupant detection system and an integrity check circuit according to a first variant.

FIG. 2 shows the schematic circuit diagram of a seat heater, a capacitive occupant detection system and an integrity check circuit 20 according to a first preferred variant of the invention. The seat heater comprises a power supply 22 providing a current source and a current sink to which the seat heating element 10 is operatively connected. The capacitive occupant detection system comprises the sensing electrode 12 and the shielding electrode 14 as well as a capacitive measurement circuit 23 to which the electrodes 12 and 14 are operatively connected. The arrangement further comprises an integrity check circuit 20 for finding circuit interruptions or short circuits.

In the following description, to facilitate reading and understanding, reference signs referring to a switch will be in the form "SX", where X denotes the number of the switch. The first switch may thus be denoted as "first switch S1", "switch S1" or, in short, simply "S1". The same convention is used for the nodes, whose reference signs will have the form "NX", the resistors, whose reference signs will have the form "RX", and the diodes, whose reference signs will have the form "DX", X designating each time the number of the item in question used also in the general description and the claims. As concerns the resistors, the reference sign of a resistor may also be used herein to denote the resistance value of the resistor. It should be noted that for the purposes of the present, ordinal numbers are only used for conveniently distinguishing between the various switches, resistors and nodes, not for indicating an order of importance or the like.

The seat heating element 10 is connected to the power source via switches S1 and S2 of an electrically controllable switching arrangement. S1 and S2 are arranged between the current source and the seat heating element 10, and between the current sink and the seat heating element 10, respectively. More precisely, switch S1 is arranged between a first node N1 located upstream (with respect to the sense of the heating current) of the seat heating element 10 and the current source. Switch S2 is arranged between a second node N2 located downstream of the seat heating element 10 and the current sink. When both S1 and S2 are closed, the heating current may flow through the seat heating element 10, which thus dissipates heat and raises the temperature of the seating surface.

The sensing electrode 12 is connected to the capacitive measurement circuit 23 via a third node N3, while the shielding electrode is connected to the capacitive measurement circuit 23 via fourth node N4. The switching arrangement further comprises third and fourth switches S3, S4.

Switch S3 connects, when in closed state, node N1 to the node N4, whereas S4 connects, when in closed state, node N2 to node N4. When S1 and S2 are open while S3 and S4 are closed, the system is in condition for capacitive occupant detection. The measurement circuit 23 then applies an oscillating voltage to the shielding electrode 14. An amplifier circuit of the capacitive measurement circuit 23 applies to the sensing electrode 12 a voltage that corresponds to the shielding electrode voltage in both amplitude and phase. The measurement circuit 23 thus keeps the sensing electrode 12 and the shielding electrode 14 at substantially the same electrical potential during the capacitive measurement. To determine capacitive coupling between the sensing electrode 12 and an occupant or an occupying item of the seat, the capacitive measurement circuit 23 measures the current that flows into the sensing electrode 12 in response to the oscillating voltage being applied to it, or (additionally or alternatively) a current induced in another electrode (a so-called "receive electrode", not shown in the drawings) of the capacitive sensing system. In the configuration of FIG. 2, the seat heating element 14 acts as part of the shielding electrode 14 when the capacitive measurement is carried out. As the seat heating element 10 and the sensing electrode are on substantially the same electrical potential during this measurement, there is no or only an insignificant electrical field between them: Accordingly, the seat heating element is "invisible" for the sensing electrode. Nevertheless, the seat heating element 10 reduces capacitive coupling between the sensing electrode 12 and an occupant or an item placed on the vehicle seat. The reduction in capacitive coupling depends mainly on the geometry of the seat heating element 10. If the shielding effect of a given seat heating element would be too important for reliable occupant detection, one should consider using the configurations of FIG. 3 or 4, which are discussed in detail below.

The integrity check circuit 20 comprises a DC voltage source (delivering a certain voltage Ug), a current meter 25 and switch S5, which are connected in series between the node N4 and ground. It further comprises a switch S6, which interconnects, in closed state, the nodes N3 and N4. The arrangement further comprises a first resistor R1, connected between N2 and ground and a second resistor R2 connected between N1 and ground. The resistance values of R1 and R2 are much higher (e.g. 1 k$\Omega$) than the resistance value of the seat heating element (typically a few $\Omega$, e.g. 2.5$\Omega$), so that they do not significantly affect seat heating operation when switches S1 and S2 are closed. On the other hand, the resistance values of R1 and R2 are sufficiently low, so that a measurable current flows through them when the switches S3, S4 and S5 are closed (while the others are open).

The integrity check circuit 20 is used to identify short circuits or circuit interruptions in the system. For the rest of the description, we will assume that the resistance values of R1 and R2 are equal and that the resistance of the seat heater can be neglected when compared to these values. A check sequence may have the following form: a) Checking the closed state of switches S5 and S6, by closing these switches and opening switches S1, S2, S3 and S4, and measuring the resulting voltages on sensing electrode 12 and shielding electrode 14. If the voltage measured on the shielding electrode 14 is not Ug, then S5 is defective; if the voltage measured on the sensing electrode 12 is not Ug, then S6 is defective. b) Checking for a short circuit between the seat heating element 10 and the sensing electrode 12, by closing switches S5 and S6, opening switches S1, S2, S3 and S4, and measuring the current Ig flowing through S5 (using the current meter 25). If no current flows (Ig=0), there is no short circuit; if Ig=Ug/R1, then the seat heating element 10 is interrupted and a short circuit has occurred between the seat heating element 10 and the sensing electrode 12; if Ig=2 Ug/R1, a short circuit has occurred between the seat heating element 10 and the sensing electrode 12. c) Checking the open state of S1 and S2 and the closed state of S3, by closing S5, S6 and S3 and opening S1, S2, S4 and measuring the current Ig flowing through S5. If Ig=2 Ug/R1, then everything is fine; if Ig=Ug/R1, then the seat heating element 10 is interrupted; if Ig=0, then 53 is defective (interrupted); if Ig>>2 Ug/R1, then S1 or S2 is shorted. d) Checking the open state of S1 and S2 and the closed state of S4, by closing S5, S6 and S4 and opening S1, S2, S3 and measuring the current Ig flowing through S5. If lg=2 Ug/R1, then everything is fine; if Ig=Ug/R1, then the seat heating element 10 is interrupted; if Ig=0, then 54 is defective (interrupted); if Ig>>2 Ug/R1, then S1 or S2 is shorted.

Figure 3:
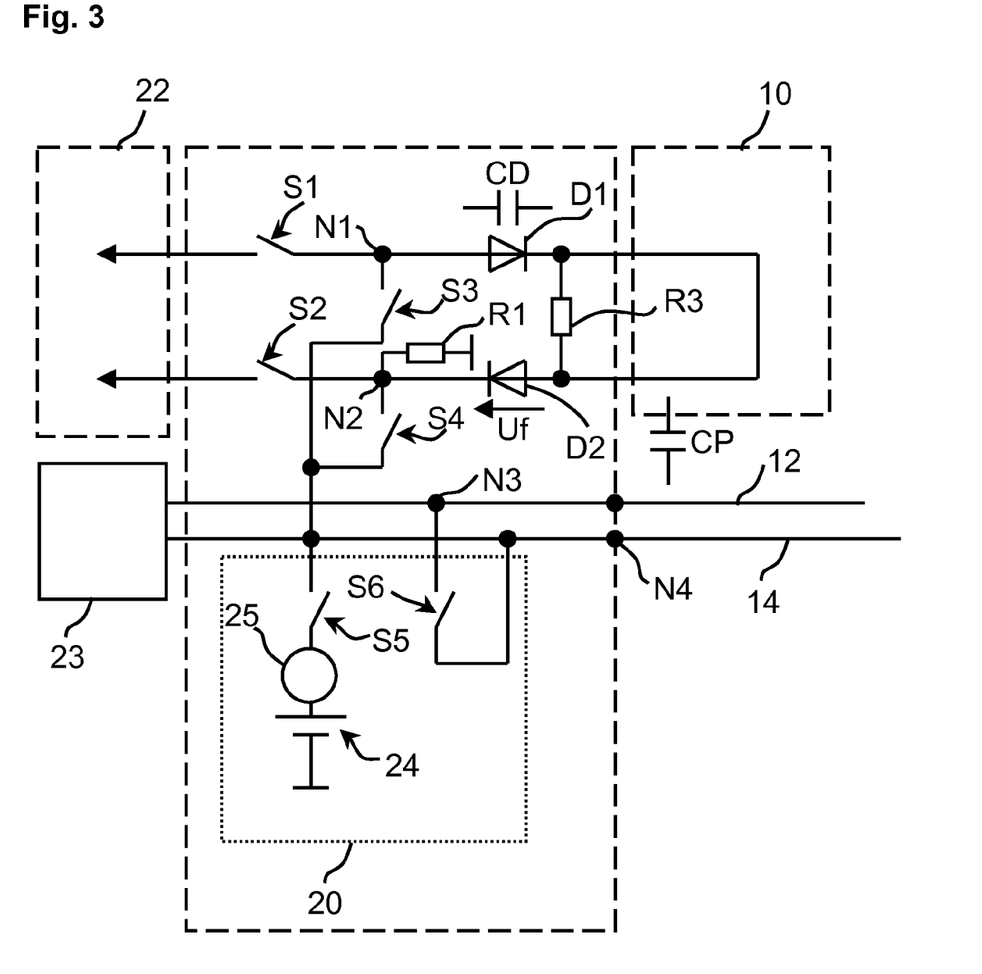
FIG. 3 is a schematic illustration of a seat heater, a capacitive occupant detection system and an integrity check circuit according to a second variant.

FIG. 3 shows the schematic circuit diagram of a seat heater, a capacitive occupant detection system and an integrity check circuit according to a second preferred variant of the invention. The circuit diagram of this variant is very similar to the one discussed beforehand and the details relating to the connection of the seat heating element and the electrodes need not be repeated. The arrangement of FIG. 3 comprises a third resistor R3 connected in parallel to the seat heating element, a first diode D1 connected downstream (with respect to the sense of the heating current) of the first node N1 and upstream of the parallel connection of R3 and the seat heating element 10, and a second diode connected upstream of the second node N2 and downstream of the of the parallel connection of R3 and the seat heating element 10. With respect to FIG. 2, the second resistor R2 has been omitted. The resistance value of R3 is chosen substantially higher than the resistance value of the seat heating element 10, so that only an insignificant part of the heating current is deviated through R3. The diodes D1 and D2 are chosen such that their capacitance CD is substantially smaller than the parasitic capacitance CP between the sensing electrode 12 and the seat heating element: CP>>2 CD.

In the configuration of FIG. 3, when switches S1, S2, S5 and S6 are open and switches S3 and S4 are closed (switching state for the capacitive measurement) the nodes N1 and N2 are at the same oscillating potential as the shielding electrode. Since CP>>2 CD, the capacitive coupling of the seat heating element 10 itself to the sensing electrode 12 will be much stronger than to the nodes N1 and N2 (and thus to the shielding electrode). It should be kept in mind that, during the capacitive measurement, the sensing electrode 12 is kept at substantially the same voltage as the shielding electrode 14. Accordingly, due to the capacitive coupling between the sensing electrode 12 and the seat heating element 10, the AC voltage drop across the diodes D1 and D2 will remain negligible so that no current flows there through. As a consequence, during the measurement, the seat heating element 10 acts as part of the capacitive measurement system and does not shield the sensing electrode from the occupant or the occupying item placed on the vehicle seat.

The integrity check circuit 20 is again used to identify short circuits or circuit interruptions in the system. A check sequence may have the following form: a) Checking the closed state of switches S5 and S6, by closing these switches and opening switches S1, S2, S3 and S4, and measuring the resulting voltages on sensing electrode 12 and shielding electrode 14. If the voltage measured on the shielding electrode 14 is not Ug, then S5 is defective; if the voltage measured on the sensing electrode 12 is not UG, then S6 is defective. b) Checking for a short circuit between the seat heating element 10 and the sensing electrode 12, by closing switches S5 and S6, opening switches S1, S2, S3 and S4, and measuring the current Ig flowing through S5. If no current flows (Ig=0), there is no short circuit; if Ig=(Ug−Uf)/(R1+R3), then the seat heating element 10 is interrupted and a short circuit has occurred between the seat heating element 10 and the sensing electrode 12; if Ig=2(Ug−Uf)/R1, a short circuit has occurred between the seat heating element 10 and the sensing electrode 12. c) Checking the open state of S1 and S2 and the closed state of S3, by closing S5, S6 and S3 and opening S1, S2, S4 and measuring the current Ig flowing through S5. If Ig=(Ug−2Uf)/R1, then everything is fine; if Ig=(Ug−2Uf)/(R1+R3), then the seat heating element 10 is interrupted; if Ig=0, then S3, D1, D2 or R1 is defective (interrupted); if Ig>>(Ug−2Uf)/R1, then S1, S2, D1 or D2 is shorted. d) Checking the open state of S2 and the closed state of S4, by closing S5, S6 and S4 and opening S1, S2, S3 and measuring the current Ig flowing through S5. If Ig=Ug/R1, then everything is fine; if Ig=0, then S4 or R1 is defective (interrupted); if Ig>>Ug/R1, then S2 or R1 is shorted.

Figure 4:
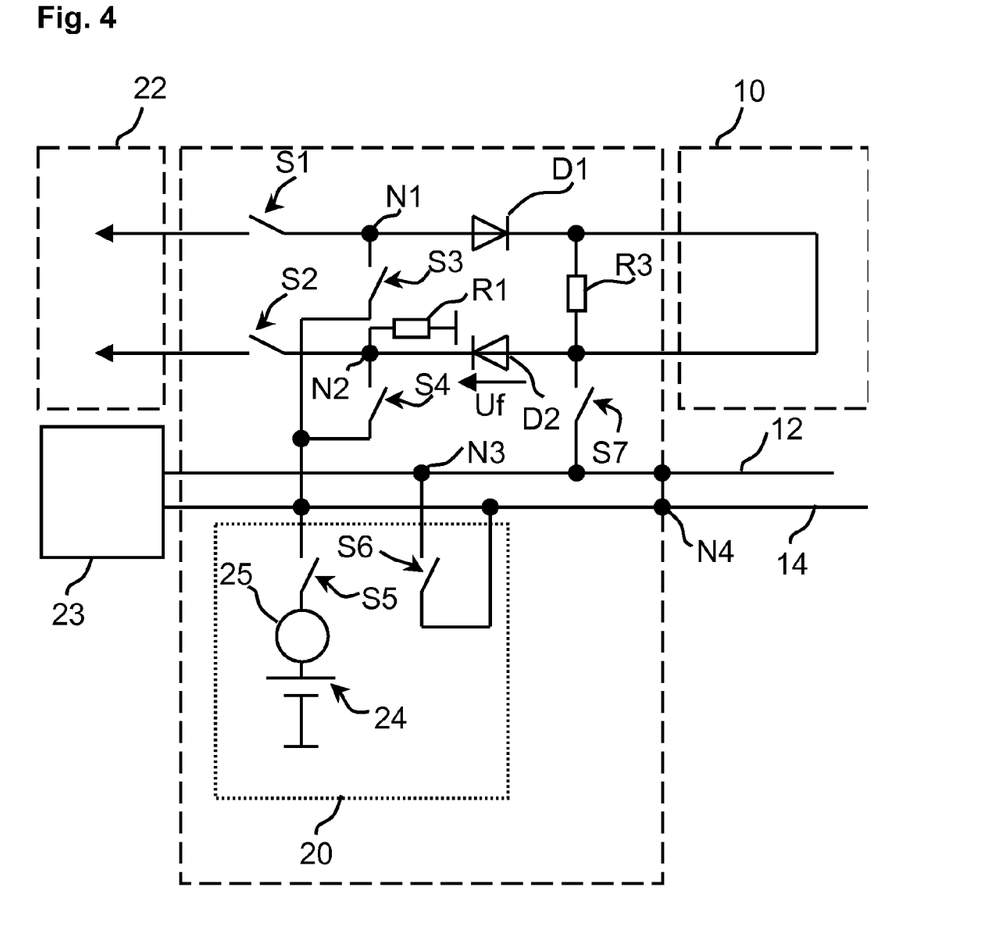
FIG. 4 is a schematic illustration of a seat heater, a capacitive occupant detection system and an integrity check circuit according to a third variant.

FIG. 4 shows the schematic circuit diagram of a seat heater, a capacitive occupant detection system and an integrity check circuit according to a third preferred variant of the invention. The circuit diagram of this variant is again very similar to the ones discussed beforehand. For the understanding of the operation of this variant, it will be sufficient to focus on the differences that exist with respect to the version of FIG. 3. In addition to the elements already known from the description of FIG. 3, the arrangement of FIG. 4 comprises a seventh switch S7 arranged between diode D2 and the parallel connection of the seat heating element and R3. When the capacitive measurement is carried out, the switching state of the switching arrangement is as follows: S1, S2, S5 and S6 are open, while S3, S4 and S7 are closed. The seat heating element 10 thus operates as part of the sensing electrode 12, while the nodes N1 and N2 are connected to the shielding electrode. Since the voltage on the sensing electrode 12 (and in this case the seat heating element) is kept at substantially the same potential as the shielding electrode during the capacitive measurement, the capacitance CD of the diodes D1 and D2 does not significantly affect the measurement.

In the variant of FIG. 4, the integrity check may be effected as the following sequence: a) Checking the closed state of switches S5 and S6, by closing these switches and opening switches S1, S2, S3, S4 and S7, and measuring the resulting voltages on sensing electrode 12 and shielding electrode 14. If the voltage measured on the shielding electrode 14 is not Ug, then S5 is defective; if the voltage measured on the sensing electrode 12 is not UG, then S6 is defective. b) Checking for a short circuit between the seat heating element 10 and the sensing electrode 12 (i.e. a shorting of switch S7), by closing switches S5 and S6, opening switches S1, S2, S3, S4 and S7, and measuring the current Ig flowing through S5. If no current flows (Ig=0), there is no short circuit; if Ig=(Ug−Uf)/(R1+R3), then the seat heating element 10 is interrupted and a short circuit has occurred between the seat heating element 10 and the sensing electrode 12; if Ig=2(Ug−Uf)/R1, a short circuit has occurred between the seat heating element 10 and the sensing electrode 12. c) Checking the open state of S1 and S2 and the closed state of S3, by closing S5, S6, S3 and opening S1, S2, S4, S7 and measuring the current Ig flowing through S5. If Ig=(Ug−2Uf)/R1, then everything is fine; if Ig=(Ug−2Uf)/(R1+R3), then the seat heating element 10 is interrupted; if Ig=O, then S3, D1, D2 or R1 is defective (interrupted); if Ig>>(Ug−2Uf)/R1, then S1, S2, S7, D1 or D2 is shorted. d) Checking the open state of S1 and S2 and the closed state of S4, by closing S5, S6, S4 and opening S1, S2, S3, S7 and measuring the current Ig flowing through S5. If Ig=Ug/R1, then everything is fine; if Ig=0, then S4 or R1 is defective (interrupted); if Ig>>Ug/R1, then S2 or R1 is shorted. e) Checking closed state of S7 by closing switches S5, S6, S7 and opening switches S1, S2, S3, S4 and measuring Ig. If Ig=(Ug−Uf)/R1, everything is fine, if Ig=0, then S7 or R1 is interrupted; if Ig=(Ug−Uf)/R1 then S2, D2 or R1 is shorted.

As those skilled will appreciate, numerous sequences for checking the different components other than those indicated hereinbefore for illustration may be used within the context of the present invention. It shall also be noted that, preferably, the electrically controllable switching arrangement is controlled by the capacitive measurement circuit or a control unit common to the capacitive measurement circuit and the switching arrangement. The capacitive measurement circuit, the switching arrangement and the common control unit are preferably integrated as an application-specific integrated circuit (ASIC), a field programmable gate array (FPGA), a digital signal processor (DSP) or the like. Such capacitive measurement circuit or control unit common to the capacitive measurement circuit and the switching arrangement may also be used to control operation of the seat heater.

The invention claimed is:

1. An arrangement comprising a vehicle seat in combination with a seat heater and a capacitive occupant detection system, wherein said seat heater comprises a seat heating element disposed in said vehicle seat, wherein said capacitive occupant detection system comprises an electrode arrangement and a measurement circuit; wherein said electrode arrangement is disposed in said vehicle seat and includes a sensing electrode and a shielding electrode, wherein said measurement circuit is operatively connected to said sensing electrode and to said shielding electrode wherein said measurement circuit is configured to keep said sensing electrode and said shielding electrode at substantially the same electric potential during a capacitive measurement, wherein, of said seat heating element, said sensing electrode and said shielding electrode, said seat heating element is closest to a seating region of said vehicle seat, and wherein said sensing electrode is arranged between said seat heating element and said shielding electrode, wherein said seat heater comprises a current source and a current sink, as well as a first node operatively connected between said current source and said seat heating element and a second node operatively connected between said current sink and said seat heating element, wherein said sensing electrode comprises a third node through which said sensing electrode is operatively connected to said capacitive measurement circuit, said shielding electrode comprising a fourth node through which said shielding electrode is operatively connected to said to said capacitive measurement circuit, and wherein an electrically controllable switching arrangement is provided, said switching arrangement comprising an electrically controllable first switch arranged between said first node and said current source, said first switch having a closed state, in which said first node is connected to said current source by said first switch and an open state, in which said first node is disconnected from said current source by said first switch;

an electrically controllable second switch arranged between said second node and said current sink, said second switch having a closed state, in which said second node is connected to said current sink by said second switch and an open state, in which said second node is disconnected from said current sink by said second switch;

an electrically controllable third switch arranged between said first and fourth nodes, said third switch having a closed state, in which said first node is connected to said fourth node by said third switch and an open state, in which said first node is disconnected from said fourth node by said third switch;

an electrically controllable fourth switch arranged between said second and fourth nodes, said fourth switch having a closed state, in which said second node is connected to said fourth node by said fourth switch and an open state, in which said second node is disconnected from said fourth node by said fourth switch;

said switching arrangement having a first switching state for heating operation of said seat heater, in which first switching state said first and second switches are in closed state and said third and fourth switches are in open state, and a second switching state for capacitive occupant detection of said capacitive occupant detection system, in which second switching state said first and second switches are in open state and said third and fourth switches are in closed state.

2. The arrangement as claimed in claim 1, comprising an integrity check circuit, said integrity check circuit including a DC voltage source, a current meter and an electrically controllable fifth switch, said DC voltage source being operatively connected to said fourth node via said fifth switch, said current meter being arranged so as to measure current flowing through said fifth switch when said fifth switch is in closed state.

3. The arrangement as claimed in claim 2, comprising an electrically controllable sixth switch arranged between said third and fourth nodes, said sixth switch having a closed state, in which said third node is connected to said fourth node.

4. The arrangement as claimed in claim 2, wherein said seat heating element has a nominal resistance, wherein said arrangement comprises a first resistor connected between said second node and ground, said first resistor having a resistance exceeding the nominal resistance of said seat heating element by a factor of at least 100.

5. The arrangement as claimed in claim 4, wherein said first resistor has a resistance exceeding the nominal resistance of said seat heating element by a factor of at least 400.

6. The arrangement as claimed in claim 4, comprising a second resistor connected between said first node and ground, said second resistor having a resistance exceeding the nominal resistance of said seat heating element by a factor of at least 100.

7. The arrangement as claimed in claim 6, wherein said second resistor has a resistance exceeding the nominal resistance of said seat heating element by a factor of at least 400.

8. The arrangement as claimed in claim 6, comprising a third resistor, said third resistor being connected between said first and second nodes in parallel to said seat heating element, said third resistor having a resistance exceeding the nominal resistance of said seat heating element by a factor of at least 100.

9. The arrangement as claimed in claim 8, wherein said third resistor has a resistance exceeding the nominal resistance of said seat heating element by a factor of at least 400.

10. The arrangement as claimed in claim 8, comprising a first diode connected between said first node and the parallel connection of said third resistor and said seat heating element as well as a second diode connected between said second node and the parallel connection of said third resistor and said seat heating element, the forward directions of the first and second diode being from current source to current sink.

11. The arrangement as claimed in claim 10, comprising an electrically controllable seventh switch connected between said third node and the parallel connection of said third resistor and said seat heating element.

12. A vehicle seat equipped with a seat heater and a capacitive occupant detection system, wherein said seat heater comprises a seat heating element disposed in said vehicle seat, wherein said capacitive occupant detection system comprises an electrode arrangement and a measurement circuit; wherein said electrode arrangement is disposed in said vehicle seat and includes a sensing electrode and a shielding electrode, wherein said measurement circuit is operatively connected to said sensing electrode and to said shielding electrode, wherein said measurement circuit is configured to keep said sensing electrode and said shielding electrode at substantially the same variable electric potential during a capacitive measurement, wherein, of said seat heating element, said sensing electrode and said shielding electrode, said seat heating element is closest to a seating region of said vehicle seat, and wherein said sensing electrode is arranged between said seat heating element and said shielding electrode, wherein said seat heater comprises a current source and a current sink, as well as a first node operatively connected between said current source and said seat heating element and a second node operatively connected between said current sink and said seat heating element, wherein said sensing electrode comprises a third node through which said sensing electrode is operatively connected to said capacitive measurement circuit, said shielding electrode comprising a fourth node through which said shielding electrode is operatively connected to said to said capacitive measurement circuit, and wherein an electrically controllable switching arrangement is provided, said switching arrangement comprising:

an electrically controllable first switch arranged between said first node and said current source, said first switch having a closed state, in which said first node is connected to said current source by said first switch and an open state, in which said first node is disconnected from said current source by said first switch;

an electrically controllable second switch arranged between said second node and said current sink, said second switch having a closed state, in which said second node is connected to said current sink by said second switch and an open state, in which said second node is disconnected from said current sink by said second switch;

an electrically controllable third switch arranged between said first and fourth nodes, said third switch having a closed state, in which said first node is connected to said fourth node by said third switch and an open state, in which said first node is disconnected from said fourth node by said third switch;

an electrically controllable fourth switch arranged between said second and fourth nodes, said fourth switch having a closed state, in which said second node is connected to said fourth node by said fourth switch and an open state, in which said second node is disconnected from said fourth node by said fourth switch;

said switching arrangement having a first switching state for heating operation of said seat heater, in which first switching state said first and second switches are in closed state and said third and fourth switches are in open state, and a second switching state for capacitive occupant detection of said capacitive occupant detection system, in which second switching state said first and second switches are in open state and said third and fourth switches are in closed state.

* * * * *